United States Patent [19]

Brady et al.

[11] Patent Number: 5,613,067

[45] Date of Patent: Mar. 18, 1997

[54] METHOD AND APPARATUS FOR ASSURING THAT MULTIPLE MESSAGES IN A MULTI-NODE NETWORK ARE ASSURED FAIR ACCESS TO AN OUTGOING DATA STREAM

[75] Inventors: James T. Brady; Damon W. Finney, both of San Jose; Donald J. Lang, Cupertino; George B. Marenin, San Jose; David Nowlen, Morgan Hill, all of Calif.

[73] Assignee: International Business Machines Corporation, Armonk, N.Y.

[21] Appl. No.: 176,042

[22] Filed: Dec. 30, 1993

[51] Int. Cl.$^6$ .............................. G06F 13/20; G06F 13/28

[52] U.S. Cl. .................. 395/200.13; 395/859; 395/860; 395/868

[58] Field of Search ...................... 395/200, 425, 395/325, 859, 860, 868, 200.13

[56] References Cited

U.S. PATENT DOCUMENTS

| | | | |
|---|---|---|---|
| 4,298,959 | 11/1981 | Sundermeyer et al. | 364/900 |
| 4,380,046 | 4/1983 | Fung | 364/200 |
| 4,550,402 | 10/1985 | Gable et al. | 370/85 |
| 4,623,996 | 11/1986 | McMillen | 370/60 |
| 4,683,564 | 7/1987 | Young et al. | 370/63 |
| 4,750,171 | 6/1988 | Kedar et al. | 370/85 |
| 4,763,317 | 8/1988 | Lehman et al. | 370/58 |
| 4,811,365 | 3/1989 | Manno | 375/107 |
| 4,979,100 | 12/1990 | Makris et al. | 364/200 |
| 4,980,820 | 12/1990 | Youngblood | 364/200 |
| 4,980,822 | 12/1990 | Brantley, Jr. et al. | 364/200 |
| 5,008,878 | 4/1991 | Ahmadi et al. | 370/60 |
| 5,023,832 | 6/1991 | Fulcher, Jr. et al. | 364/900 |
| 5,105,424 | 4/1992 | Flaig et al. | 370/94.1 |
| 5,117,420 | 4/1992 | Hillis et al. | 370/60 |
| 5,191,578 | 3/1993 | Lee | 370/63 |
| 5,202,987 | 4/1993 | Bayer et al. | 395/650 |
| 5,237,670 | 8/1993 | Wakerly | 395/425 |
| 5,247,618 | 9/1993 | David et al. | 395/275 |
| 5,278,834 | 1/1994 | Mazzola | 370/94.1 |
| 5,313,594 | 5/1994 | Wakerly | 395/325 |

FOREIGN PATENT DOCUMENTS

| | | |
|---|---|---|
| 0482761A2 | 9/1991 | European Pat. Off. . |
| WO88/08167 | 10/1988 | WIPO . |

OTHER PUBLICATIONS

IBM Technical Disclosure Bulletin, vol. 36, No. 7, Jul. 1993, (pp. 117–120).

European Search Report, EP 94 30 9590 dtd 3 Nov. 1995.

*Primary Examiner*—Thomas C. Lee
*Assistant Examiner*—Rehana Perveen Krick
*Attorney, Agent, or Firm*—Ohlandt, Greeley, Ruggiero & Perle

[57] ABSTRACT

A multi-node data processing system implements a method that assures that plural messages are enabled "fair" access to a data stream. Each node includes apparatus for controlling message transmissions and/or receptions from another node over a communication network. The method comprises the steps of: transmitting a routing message from a first destination node to a source node, the routing message signalling a readiness of the destination node to receive a data message; transmitting a first data message to the first destination node from the source node in response to the ready message; transmitting a conditional disconnect message from the first destination node to the source node upon receipt of a predetermined amount (i.e. a "slice") of the first data message. The source node responds to the conditional disconnect message by either (1) disconnecting from the first destination node, and commencing transmission of a slice of a second data message to a second destination node if during transmission of the slice of the first data message, the source node has received a ready message from the second destination node; or (2) continuing transmission of the data message to the first destination node until message end or, following the procedure in (1) if a new ready message is received by the source node from a further destination node, whichever occurs first.

14 Claims, 7 Drawing Sheets

METHOD AND APPARATUS FOR ASSURING THAT MULTIPLE MESSAGES IN A MULTI-NODE NETWORK ARE ASSURED FAIR ACCESS TO AN OUTGOING DATA STREAM

FIELD OF THE INVENTION

This invention relates to communication management within a multi-node network, and, more particularly, to a method and apparatus for controlling message transmissions in such a network to assure that contending nodes have fair access to an output data stream.

BACKGROUND OF THE INVENTION

In prior art networks, message distribution and data stream access are generally controlled at the message transmitting end or via centralized control apparatus and functions. Such control functions are implemented using both circuit switches and packet data switches. The following art is representative of such systems. U.S. Pat. No. 4,683,564 to Young et al. describes a matrix circuit switch system wherein a common timing signal is used to configure the system during time slices and to perform desired line connections for signal transfer during each time slice. U.S. Pat. No. 5,105,424 to Fflag et al. describes a packet routing system wherein routing and switching functions are dependent upon data contained in packet headers.

U.S. Pat. No. 4,750,171 to Kedar et al. discloses a time division multiple access system for a shared data bus wherein time slot channels are asynchronously allocated. In U.S. Pat. No. 5,008,808 to Ahmadi et al., a switching network is described that handles both voice and packet switch data and further employs uniform mini-packets which contain self-routing data. Ahmadi et al. employ uniform switching blocks that implement time slice message allocation.

U.S. Pat. No. 4,298,959 to Sundermeyer et al. describes a direct memory access message transfer system wherein asynchronously received data is stored in accordance with initially received data from the data stream. U.S. Pat. No. 4,380,046 to Fung describes a parallel processing array which employs centralized array communications control. U.S. Pat. No. 4,550,402 of Gable et al. describes a packet communication control system which enables communications between local computer networks. Two different types of mini-packets are employed with one type including header destination address data and word count information in the message portion. The second type of mini-packet includes the data message.

U.S. Pat. No. 4,623,996 to McMillen describes a packet switching node that responds to packets with routing tag signals. Lehman et al. in U.S. Pat. No. 4,763,317 describe a communication network for both narrow and wideband communications. Integrated control systems concurrently control both a narrow and wideband equipment to enable more efficient message transfer. In U.S. Pat. No. 4,811,365 to Manno, a protocol is described that enables multiple nodes to share a channel through a satellite. One node is designated as a reference node and others are designated as slave nodes, with the reference node controlling access and assuring synchronization of slave node transmissions.

U.S. Pat. No. 5,191,578 to Lee describes a parallel packet routing system which employs a scalable space-domain switching system between clusters of processors. Time domain-switching aspects are also employed to enable packet Switch-like control. Makris et al. in U.S. Pat. No. 4,979,100 describe a packet switch control network that employs an arbitration system to control message access to a bus. U.S. Pat. No. 5,117,420 to Hillis et al. disclose a message packet router that merges packets addressed to the same destination and enables broadcasting of message packets.

Presently, multi-node communication systems see many applications in data processing. For instance, parallel-processing systems include many node processors that operate in parallel upon a common problem and are interconnected by a matrix switch network. Other multi-node systems are used to perform control functions, such as controllers especially designed for use with disk drive memories. Such controllers must not only have the ability to control I/O functions, but also be able to interface with a communication network so that data from the disk drives can be distributed to requesting host processors. Within such a multi-node controller, data can be transferred at extremely high data rates (on the order of 100 megabytes per second). However, communication networks that connect such a multi-node controller to external host processors generally are able to handle data at lower transfer rates (e.g. 20 megabytes per second). As a result, input/output modules in the multi-node networks enable a "performance matching" of internal data transfer rates to the slower input/output devices that are attached to the respective nodes to enable operations without wasteful latencies. Otherwise, long messages emanating from a node in a multi-node network need to be buffered in large buffer memories that may delay and/or data starve other nodes seeking access to the input/output communication network interface. To control message delay and allocation in a multi-node network through the use of a central control mechanism or process adds significant overhead cost to the network. To allocate control of such messages strictly from the transmitting end also results in substantial network overhead. For instance, transmitting nodes are unaware of what acts are occurring at destination nodes or whether other transmitting nodes are making demands upon a destination node that is presently interfacing with the transmitting node. As a result, considerable communications are required to establish an understanding of conditions at both ends of a communication link.

Accordingly, it is an object of this invention to provide an improved system and method for enabling a multi-node network to control access of messages to an output data stream.

It is another object of this invention to provide a multi-node network with a "fairness" slicing procedure that assures all messages have at least a minimum of access to an output data stream.

It is yet another object of this invention to provide an improved data routing system for a multi-node network wherein communications overhead is distributed throughout the network.

SUMMARY OF THE INVENTION

A multi-node data processing system implements a method that assures that plural messages are enabled "fair" access to a data stream. Each node includes apparatus for controlling message transmissions and/or receptions from another node over a communication network. The method comprises the steps of: transmitting a routing message from a first destination node to a source node, the routing message signalling a readiness of, the destination node to receive a data message; transmitting a first data message to the first destination node from the source node in response to the ready message; transmitting a conditional disconnect message from the first destination node to the source node upon receipt of a predetermined amount (i.e. a "slice") of the first data message. The source node responds to the conditional disconnect message by either (1) disconnecting from the first destination node, and commencing transmission of a slice of a second data message to a second destination node if during transmission of the slice of the first data message, the source node has received a ready message from the second destination node; or (2) continuing transmission of the data message to the first destination node until message end or, following the procedure in (1) if a new ready message is received by the source node from a further destination node, whichever occurs first.

DETAILED DESCRIPTION OF THE INVENTION

Figure 1:
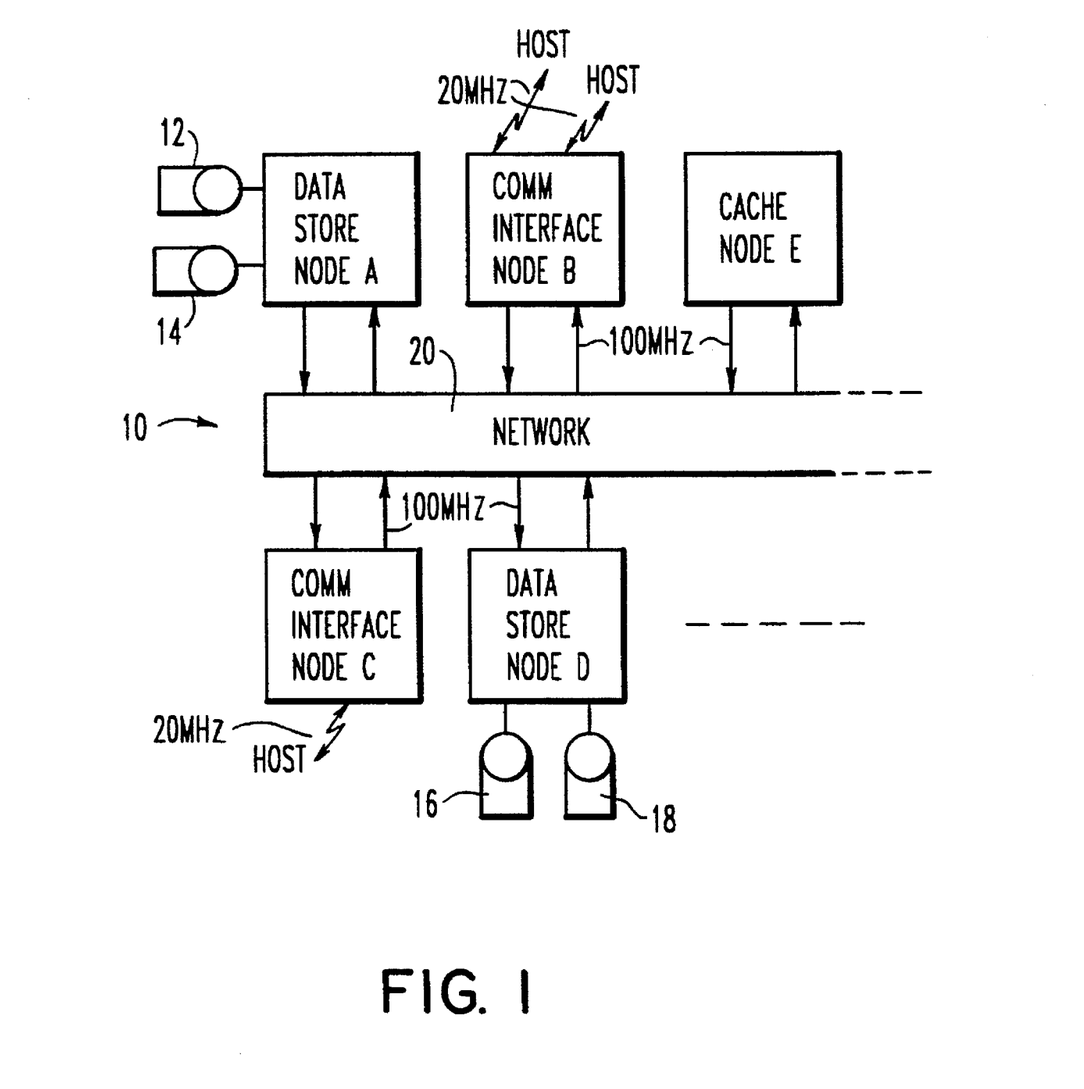
FIG. 1 is a block diagram of a multi-node network that implements the invention hereof.

In FIG. 1, a block diagram illustrates a multi-node network configured as a disk drive controller 10. Nodes A and D are data store nodes that connect, to coupled disk drives 12, 14 and 16, 18, respectively. A pair of communication interface nodes B and C provide input/output functions for disk drive controller 10. Host processors are coupled to nodes B and C via communication links that exhibit data transfer rates that are lower than available data transfer rates within disk drive controller 10. For instance, the communication links connecting nodes B and C to the host processors will characteristically operate at a 20 Megabytes/sec. transfer rate, whereas internal communications within disk drive controller 10 may operate at a 100 Megabytes/sec. rate. As a result, multi-node disk drive controller 10 must implement a procedure that enables allocation of the input/output data stream on a fairness basis across all messages which contend for the communication links. Such a procedure will be described in detail below.

In addition to data store and communication interface nodes, disk controller 10 further includes a cache node E which provides a temporary storage facility for both input and output data transfer functions. Disk drive controller 10 is expandable by addition of further nodes, all of which are interconnected by an internal communication network 20. The fairness communication protocol implemented by the invention hereof is such that it is expandable in accordance with the expansion of disk drive controller 10, without requiring any alteration to previously connected nodes or the network which interconnects them.

Figure 2:
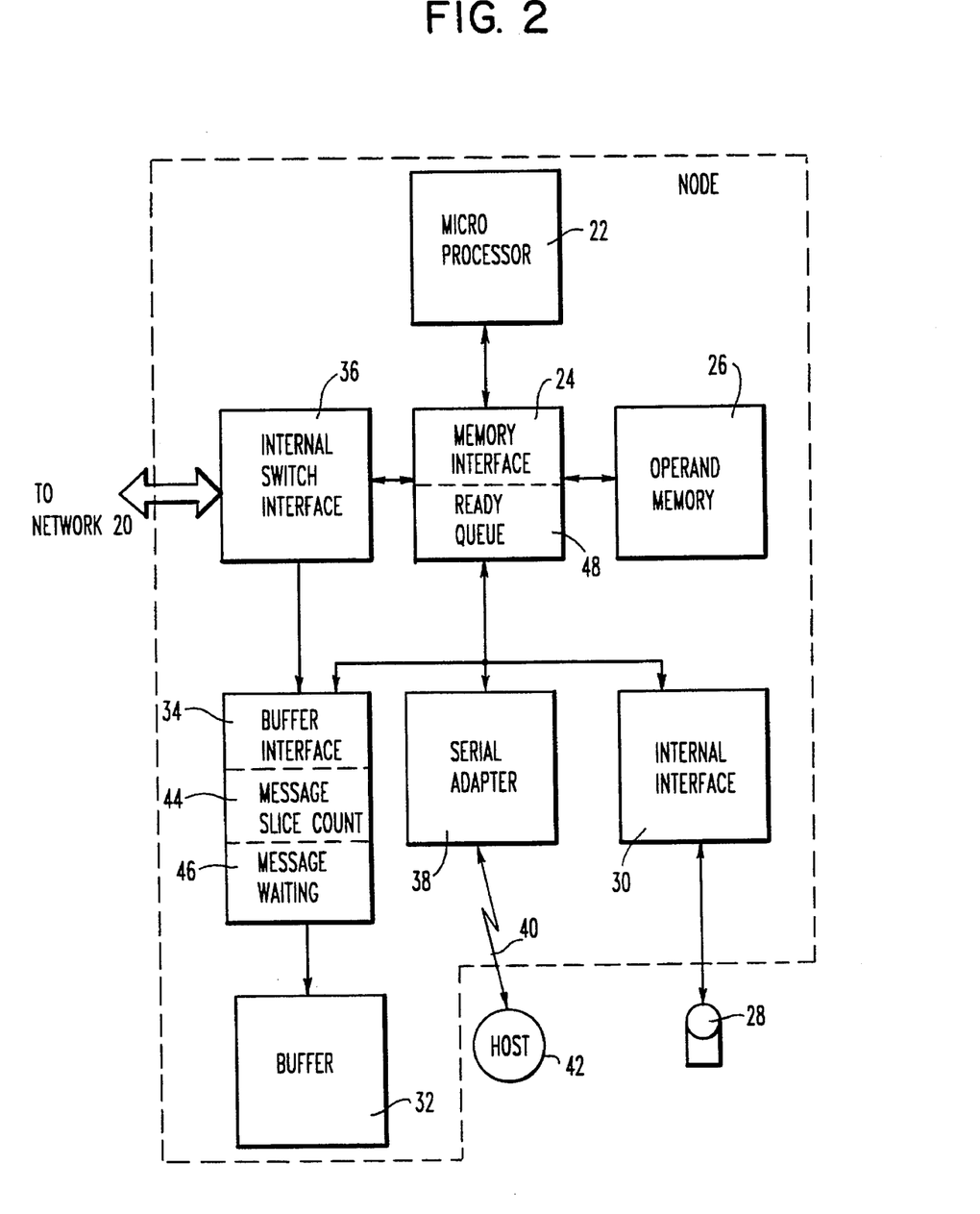
FIG. 2 is a block diagram of a representative node.

Each of nodes A–E in FIG. 1 is configured from a standard node arrangement shown in FIG. 2. A node includes a microprocessor 22 that controls the overall functions of the node. A memory interface module 24 controls communications between microprocessor 22 and plural memory modules within the node. One such memory module is an operand memory 26 which contains code that controls the operation of microprocessor 22. Another such memory is disk drive memory 28 that is connected by an interface module 30 to memory interface module 24. A buffer memory 32 is further connected by a buffer interface module 34 to memory interface module 24. Buffer memory 32 provides message buffering functions for both incoming and outgoing messages. An internal switch interface 36 provides interface functions for both incoming and outgoing message transfers.

If the node shown in FIG. 2 is utilized as a cache node, buffer module 32 will be larger in size than if the node is configured as a communication interface node or a data store node. If the node is configured as a communication interface node, it further includes a serial adapter module 38 that connects, via communication line 40, to a host processor 42. If the node is configured as a data store node, it will include an internal interface module 30 and one or more connected disk drives 28.

Certain modules within the node of FIG. 2 perform specific functions that implement the data transfer protocol to be discussed below. As will become apparent, each data message transmitted within controller 10 is assured of at least a minimum of access to an output data stream, thus assuring that at least a determined portion of the data message is transmitted. That determined portion of the data message is hereafter be referred to as a "slice". It is to be understood that the size of a message slice is a programmable function and can be varied in accordance with a user's setting of a constant within the controlling software.

Each buffer interface module 34 includes a message slice counter 44 which provides an indication when a portion of a received message equals a predetermined slice count. At such time, buffer interface module 34 issues a conditional disconnect signal via network 22 to the node from which the message was received (i.e. a "source" node).

Also within buffer interface module 34 is a latch 46 which indicates a "message waiting". Message waiting latch 46 is set when the node is receiving a message and another node seeks access to the node for message transmission purposes. Under such a condition, message waiting latch 46 is set so that when a slice of a currently incoming message is received, the node will know whether another source node is waiting its turn to obtain access.

Memory interface module 24 includes a "ready" queue 48 that is a queue of pointers to messages awaiting transmission. A ready queue is maintained when a node acts as a source node—as contrasted to when the node is receiving a message as a "destination" node.

While not specifically described herein in detail, data messages are preceded by control messages which inform various nodes of requests for data transfers and what data is being requested. A detailed discussion of such control messages is outside the scope of this invention.

It is a central assumption in the further description of this invention however, that destination nodes are aware of what messages are required to be transmitted/received and which nodes are the sources of those messages. The invention assures that, given such knowledge, that the message transmission space is fairly allocated amongst nodes so that no one node monopolizes a communication pathway.

In the description of the protocol implemented by the system shown in FIGS. 1 and 2, certain messages are employed to implement the protocol. Those messages are as follows:

Ready (RDY):

Receipt of this message tells a source node to put a message on its ready queue (RQ) and to try to commence its transmission.

Conditional Disconnect (CD):

This message is transmitted by a destination node to a source node upon a determination that a message slice from the source node has been received. The CD message instructs the source node to disconnect if a new message is waiting in the source node's ready queue either now or at some future time—but otherwise to keep transmitting the message.

Message Waiting (MW):

The MW message is generated at a destination node when, in the process of receiving a message from a first source node, a second source node attempts to transmit another message to the destination node. The message waiting latch 46 is set in such a case but is not examined until after a slice of a current incoming message is received.

A Disconnect message is then generated to the first source node to prepare for a message transmission from the second source node.

Disconnect (DC):

The DC message is generated by a destination node and instructs a source node to unconditionally disconnect from the destination node.

End of Transmission (EOT):

EOT is a flag at the end of a transmission which indicates that the transmission ends but that there is more data to be transmitted. The EOT flag is issued by the source node. End of Session (EOS):

An EOS is a flag at the end of a transmission indicating that all data has been transmitted and that the session is finished. The EOS flag is generated by a source node.

In the description of the message slicing protocol to be described with respect to FIGS. 3–10, the following nomenclature is utilized in the drawings: a source node is designated by a subscript "S"; a destination node is designated by a subscript "D"; a transmitted message is indicated as a "RDY", "CD", "EOT", etc.; and the direction of message transmission is indicated by an arrow over the message designation. Thus, $B_D \overrightarrow{RDY} A_S$ designates that node B is the destination node, node A is the source node and that node B is transmitting a Ready (RDY) message to node A.

Figure 3:
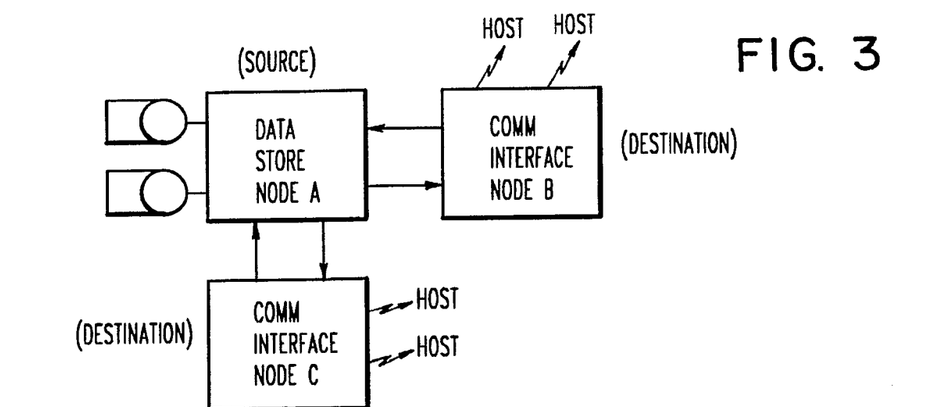
FIG. 3 is a diagram illustrating a source node and two destination nodes that are to receive messages from the source node.

In FIG. 3, nodes B and C are communication interface nodes and are destinations for messages being transmitted from node A (a data store node). Under such a circumstance, it is desired that the messages from node A be handled so that the messages for both nodes B and C have equal abilities to arrive at their respective destination nodes without being blocked, one by the other.

Figure 4:
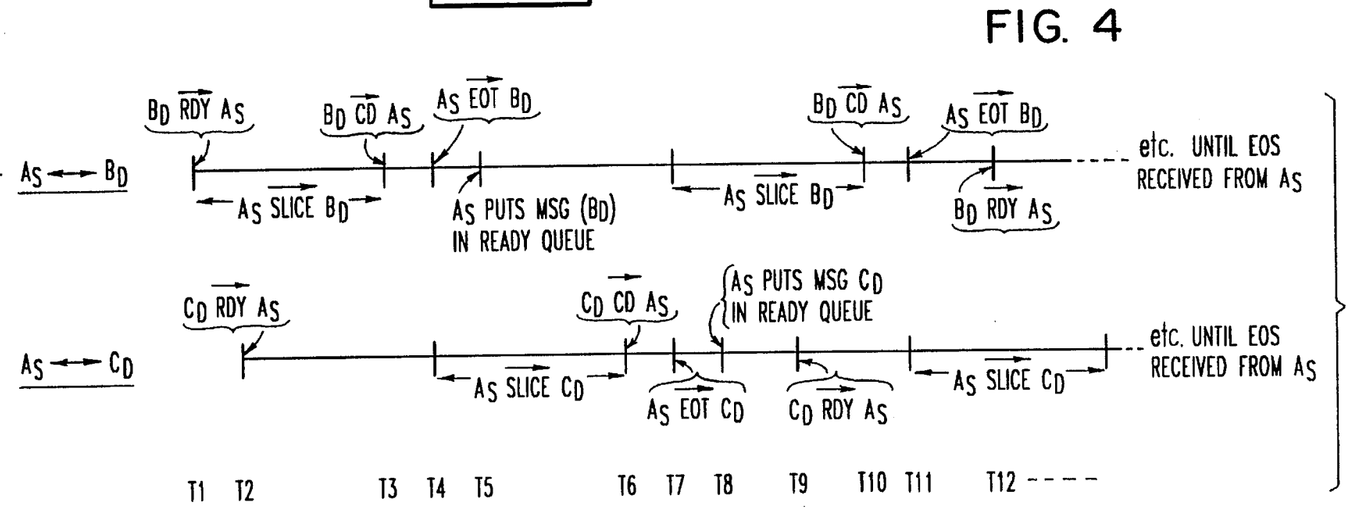
FIG. 4 are time-line charts helpful in understanding the operation of the nodes in FIG. 3 during the implementation of the message allocation procedure of the invention.

In FIG. 4, a pair of time-line plots indicate message transmissions between source node A, destination node B and source node A, destination node C. Initially, it is assumed that source node A and destination node B have been informed by control messages that a data message is to be transmitted from node A to node B. Thus, at time T1 when destination node B is prepared to receive a data message, it transmits a Ready (RDY) message to source node A. Source node A responds by transmitting a slice of the data message to destination node B (T1–T3). As above indicated, the amount of data encompassed by a message slice is user-selectable.

Assume further that both nodes A and C have been informed by control messages that a message is to be transmitted from node A (source) to node C (destination). As a result, destination node C, when it is available to receive the message, dispatches an RDY message (at T2) to source node A. However, since source node A is already transmitting a first slice of a message to destination node B, that transmission continues without interruption. However, source node A does place the data message that is destined for transmission to destination node C in its Ready queue so as to make it ready for transmission at the termination of the slice transmission to destination node B.

At T3, the message slice count module 44 in destination node B signals that a slice has been received. As a result, destination node B transmits a conditional disconnect (CD) message to source node A. At T4, source node A responds with an EOT message to destination node B indicating that message transmission is being terminated, but that additional information awaits to be transmitted. At the same time, source node A sees a message indicator in its Ready queue which designates both the message to be transmitted and the destination node (node C). Source node A thus commences transmitting a slice of that message to destination node C. At T5, destination node B sends a Ready message to source node A and source node A puts into its ready queue the remainder of the message due for transmission to destination node B.

At T6, when the first slice has been transmitted to destination node C, destination node C transmits a CD message to source node A. Because source node A sees a message for destination node B in its Ready queue, source node A responds with an EOT message at T7 to destination node C and commences transmission of a further slice of the previously transmitted message to destination node B. At times T8, T9, T10 etc., the procedure continues, with message portions for destination nodes B and C being multiplexed so that respective slices thereof are successively sent to the respective destination nodes. This action continues until both messages are completed and end of session (EOS) messages are received from source node A at the respective destination nodes.

It can thus be seen that it is a destination node that exerts basic control on message slice transfers. Furthermore, a destination node requires no knowledge of what other destination nodes are signalling a respective source node as the source node, by virtue of its Ready queue and the described slice protocol assures that no one contending destination node will obtain exclusive access to a data pathway.

Figure 5:
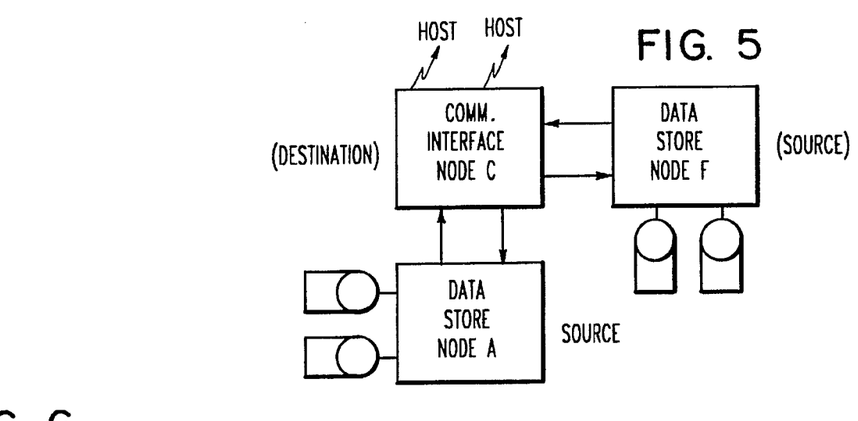
FIG. 5 is a block diagram of a pair of source nodes that wish to transmit messages to a single destination node.
Figure 6:
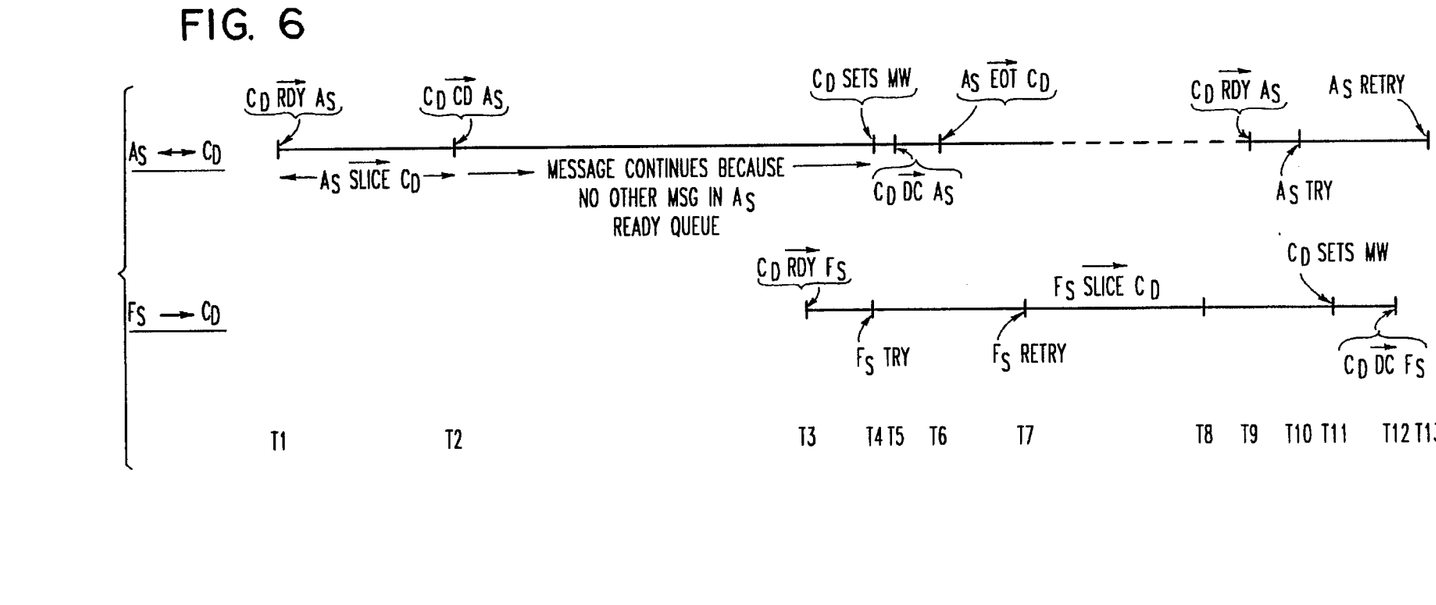
FIG. 6 are time-line chart of nodal communications helpful in understanding the operation of the nodes of FIG. 5.

Turning to FIG. 5, a case will be considered where two source nodes (nodes A and F) are in contention to transmit messages to a single destination node (node C). In FIG. 6, a pair of time-lines indicate the respective messages that are handled by the nodes and enable message transmissions to be ordered. Again, both source nodes A and F and destination node C have been informed by a control path that messages are to be transmitted to destination node C.

Assume that destination node C is initially informed that a message from node A is to be received. At a time (e.g. T1) when destination node C is available for data reception, it transmits an RDY message to node A. Source node A responds by transmitting a first slice of the message to destination node C. At time T2, node C, having received a slice, transmits a CD message to node A. In this instance, the CD message is ignored because no other message is present in the Ready queue of source node A. As a result, transmission continues of message traffic between source node A and destination node C.

Assume now that at some later time T3, destination node C is informed that source node F has a message for it. Since destination node C has already received at least a first slice of the presently incoming message from source node A, it immediately responds by sending an RDY message to source node F at T3. However, since destination node C is unaware of the state of source node F (e.g. source node F may be otherwise occupied with another message or node), node C continues receiving the message from source node A and does not immediately issue a CD message to source node A. As a result, source node A continues to transmit its message to destination node C—thereby preventing wasteful message downtime through the network.

When source node F receives the RDY message from destination node C, source node F tries to transmit its message to destination node C. However, because destination node C is still receiving a message from source node A, node C does not respond to an initial handshake signal from source node F, causing source node F to abort its transmission try. However, in response to the transmission attempt from source node F, destination node C sets its message waiting flag 46 at T4 and, immediately thereafter (at T5), transmits a DC message to source node A. The DC message differs from the CD message in that it is an absolute disconnect that causes source node A to respond by sending an EOT message to destination node C at T6. This action renders destination node C ready to receive a data message.

At some later time (e.g. T7), source node F performs a transmission retry to destination node C and succeeds in obtaining a response to its handshake action. As a result, source node F commences transmission of a first slice of a message to destination node C. When destination node C has received its first slice from source node F, it will transmit a CD message to source node F which is ignored because node F has no messages on its Ready Queue. Node C then sends a Ready message to node A at T9. When node A (at some later time T10) attempts to send the next slice of the data message, node C returns a message waiting signal and issues a disconnect to node F. Source node F then examines its message waiting flag and finds that source node A has attempted a data transmission. The procedure repeats as above indicated. The procedure then continues, on a multiplex basis, until the messages from both source nodes A and F are completed.

Figure 7:
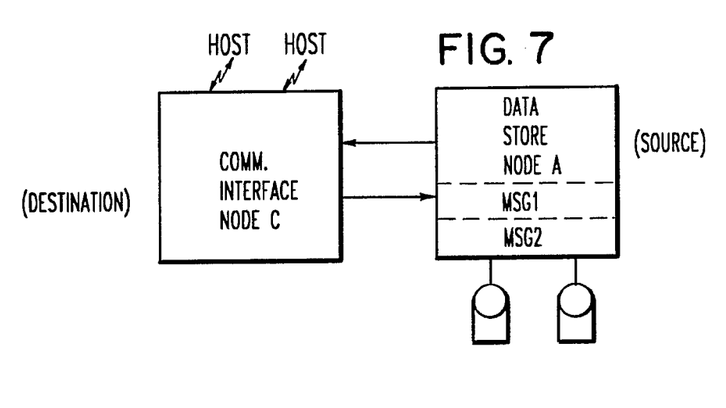
FIG. 7 is a block diagram of source and destination nodes, the source node having two messages to be transmitted to the destination node.
Figure 8:
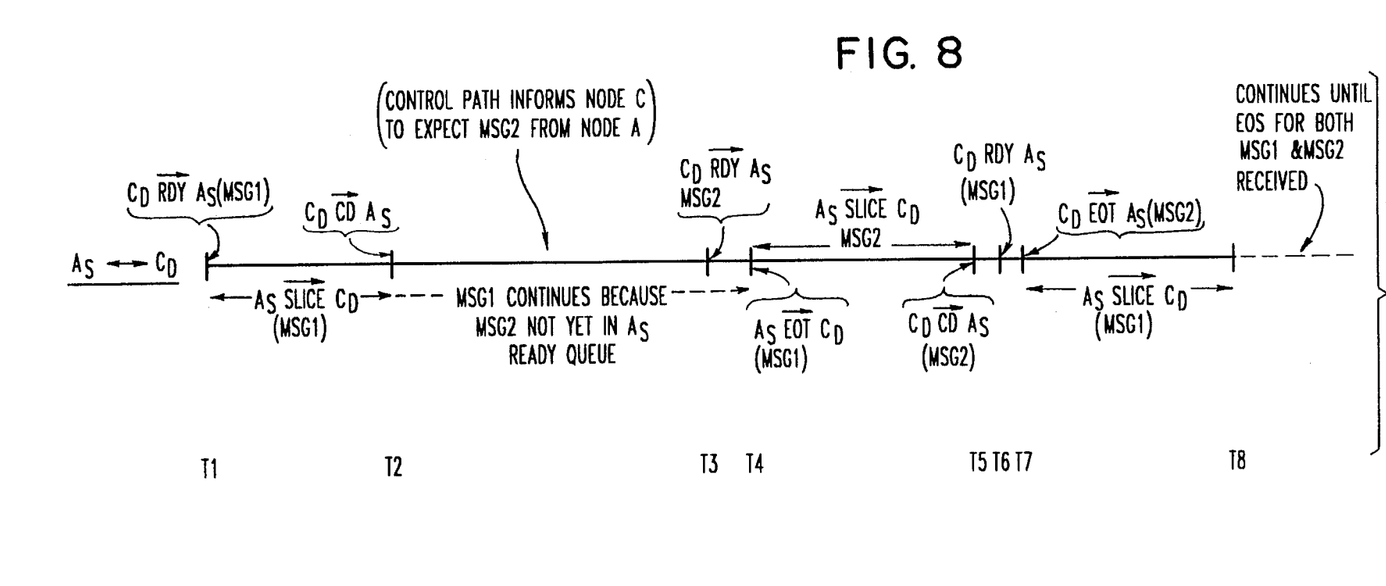
FIG. 8 is a time line chart helpful in understanding the operation of the nodes of FIG. 7.

In FIG. 7, it is assumed that source node A has two messages (1 and 2) for destination node C, and that messages 1 and 2 become ready for transmission at different times. If it is assumed that message 1 is ready for transmission at T1, then when source node A receives an RDY message from destination node C (indicating availability to receive message 1), source node A transmits the first slice of message 1. At the end of the first slice, destination node C transmits a CD message to source node A, but since message 2 has not yet been signalled as ready for transmission (and placed in the Ready cue of source node A), source node A continues transmission of message 1 to destination node C and ignores the CD message (but remembers that it has occurred).

At some time between T2 and T3, a control path informs destination node C that message 2 is ready for transmission from source node A (i.e. message 2 is in the Ready queue of source node A). Because destination node C has already received at least a first slice of message 1, it responds by transmitting an RDY message to source node A. Source node A responds by transmitting an EOT message to destination node C for message 1 (because it previously received a CD message) and commences transmission of a first slice of message 2 to destination node C. After node C receives a message slice, it sends a CD to source node A (which is ignored until a message is added to its Ready Queue). Node C then sends a Ready for message 1 to source node A and Node A sends an EOT message for message 2. The aforesaid procedure continues until an EOS message is received at destination node C for both messages 1 and 2.

Figure 9:
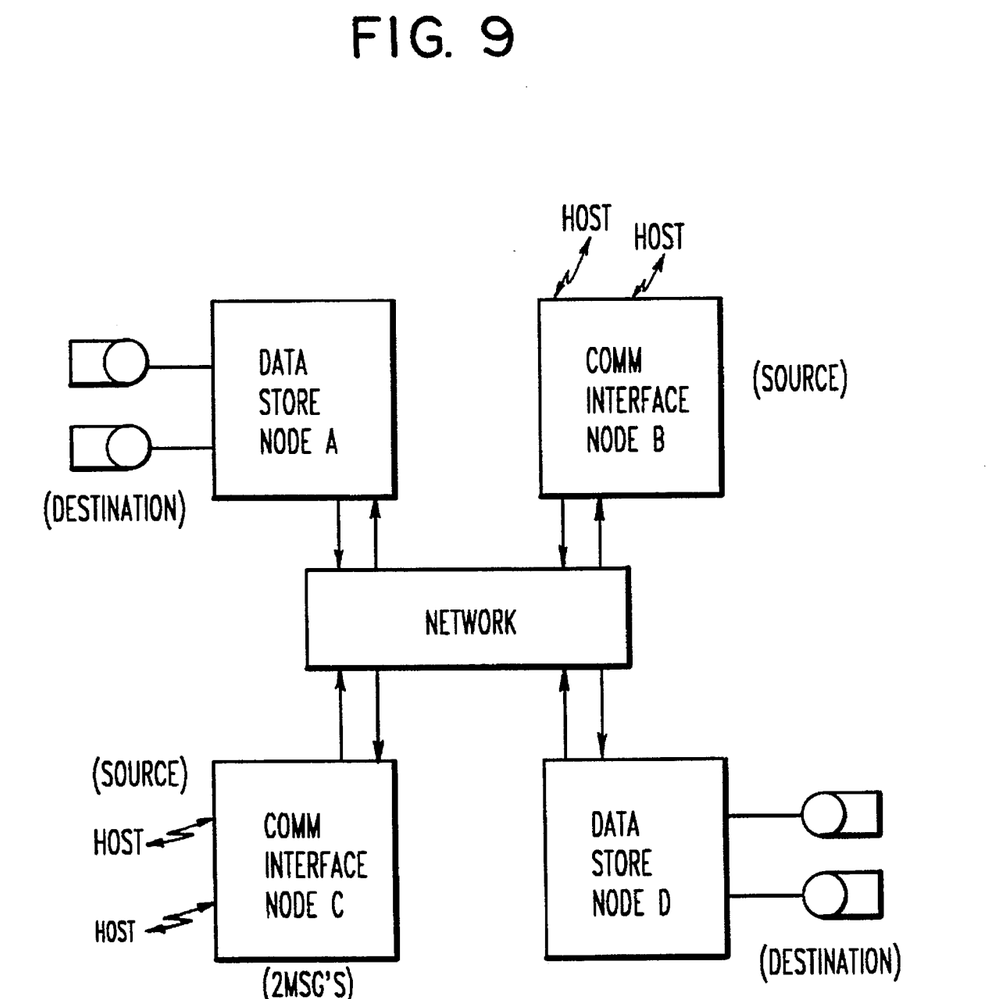
FIG. 9 is a block diagram of two source nodes and two destination nodes, with the source nodes having messages to be transmitted to the destination nodes.

Turning to FIG. 9, a message transmission condition is illustrated wherein a pair of source nodes (B and C) are transmitting messages to a pair of destination nodes (A and D) with source node C having two .messages for different destination nodes.

Figure 10:
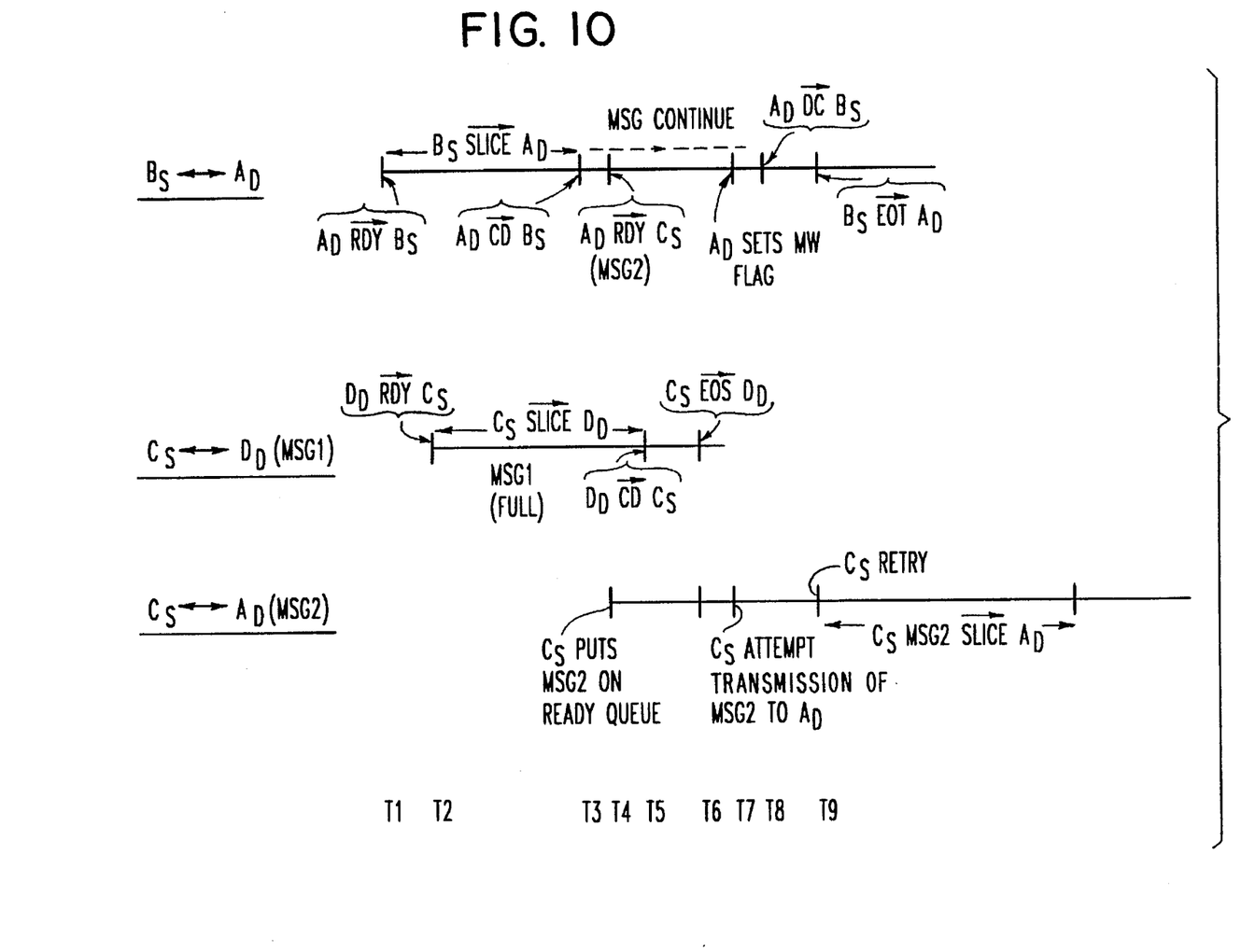
FIG. 10 are time line charts helpful in understanding the operation of the nodes of FIG. 9.

As shown in FIG. 10, at T1 destination node A transmits an RDY message to source node B, with source node B responding by transmission of a slice of its message to destination node A. At T2, it is assumed that destination node D transmits an RDY message to source node C. In response, source node C transmits a first slice of message 1 to destination node D. It is further assumed that the first slice comprises the entirety of message 1. At T3, destination node A transmits a CD message to source node B, having received a slice of the message from source node B.

Assume that destination node A has been informed by a control path that a source node C has message 2 in its Ready queue awaiting transmission. As a result, at T4 destination node A transmits an RDY message to source node C. However, source node C is still in the process of transmitting an initial message 1 slice to destination node D. Therefore, source node C is unable to respond to the handshaking action from destination node A. Source node C thus continues to transmit the message to destination node D.

When destination node D transmits a CD message (upon receipt of a slice) to source node C, source node C responds with an EOS signal as message 1 transmission has been completed. Source node C then attempts transmission of message 2 to destination node A at T6, but because destination node A is still receiving a message from source node B, destination node A does not respond to the handshake but rather sets its message waiting flag. Immediately thereafter, at T7, destination node A transmits a DC signal to source node D indicating an unconditional disconnect (it will be recalled that the unconditional disconnect is transmitted because destination node A has already received at least a first slice of a message from source node B). In response, source node B transmits an EOT message to source node A, allowing source node A to be ready to receive message transmission from source node C upon a subsequent retry at T9. The procedure then continues as aforedescribed.

In summary, message control is distributed throughout the nodal structure of a multi-node data processing system. The control procedure is indefinitely expandable since each node contains its own control mechanisms (i.e. a message slice count module, a message waiting flag latch, and a Ready queue). Those instrumentalities enable both destination and source nodes to manage data transfers in a manner that no single message is allowed to monopolize a data transmission path to the exclusion of other contending messages. Basic message control is exerted by destination nodes.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for assuring, in a multi-node data processing system, that plural messages are enabled access to a data stream, each node including means for controlling message transmission and/or reception from another node over a communication network, said method comprising the steps of:

a. transmitting a ready message from a first destination node to a source node, said ready message signalling a ready state of said first destination node to receive a data message;

b. transmitting a first data message to said first destination node from said source node in response to said ready message;

c. transmitting a conditional disconnect message from said first destination node to said source node upon receipt at said first destination node of at least a predetermined amount (i.e. a "slice") of said first data message; and d. responding at said source node, upon receipt of said conditional disconnect message, by either:

1. disconnecting from said first destination node and commencing transmission of at least a slice of a second data message to a second destination node, if during transmission of said slice of said first data message, said source node received a ready message from a second destination node; or 2. continuing transmission of said first data message to said first destination node until said first data message is completely transmitted or, if during continued transmission of said first data message, a new ready message is received from a further destination node, discontinuing transmission of said first data message and commencing transmission of at least a slice of another message to said further destination node.

2. The method as recited in claim 1, wherein in step d2, said source node disconnects substantially immediately from said first destination node upon receipt of said new ready message.

3. The method as recited in claim 1, wherein said first destination node, upon disconnecting from said source node in step d1, transmits again to said source node a further ready message if a portion of said first data message still awaits transmission, said source node, at the end of transmission of said slice of said second data message, responding to said further ready message by commencing transmission of at least a next slice of said first data message to said first destination node, said first destination node and further destination node continuing to transmit further ready messages to said source node after respective disconnections from said source node until message completion signals are received by said first destination node and further destination node, respectively.

4. A method for assuring, in a multi-node data processing system, that plural messages are enabled access to a data stream, each node including means for controlling message transmission and/or reception from another node over a communication network, said method comprising the steps of:

a. transmitting a ready message from a destination node to a scarce node, said ready message signalling said destination node's readiness to receive a data message;

b. transmitting a first data message to said destination node from said first source node in response to said ready message;

c. transmitting a conditional disconnect message from said destination node to said first source node upon receipt at said destination node of at least a predetermined amount (i.e. a "slice") of said first data message; and d. responding at said source node to said conditional disconnect message, by continuing transmission of said data message to said destination node until said data message is completely transmitted or a disconnect message is received from said destination node, said destination node transmitting said disconnect message to said source node after another source node has attempted a transmission of a new data message to said destination node.

5. The method as recited in claim 4 wherein said destination node sets a message waiting indication upon receipt of a message transmission attempt from said another source node, said message waiting indication causing said destination node to transmit said disconnect message to said first source node only after at least a slice of said first data message has been received.

6. The method as recited in claim 5 wherein said source node responds to said disconnect message by transmitting to said destination node an end of transmission message which signals that an additional portion of said data message awaits transmission, followed by said source node listing said data message in a ready queue for subsequent transmission of said additional portions.

7. The method as recited in claim 6 wherein said destination node, upon receipt of at least a slice of said new data message from said another source node, transmits a ready message to said source node, thereby enabling said source node to commence transmission of at least a slice of said additional portion of said data message listed in said ready queue.

8. A method for assuring, in a multi-node data processing system, that plural messages are enabled access to a data stream, each node including means for controlling message transmission and/or reception from another node over a communication network, said method comprising the steps of:

a. transmitting a ready message from a destination node to a source node, said ready message signalling said destination node's readiness to receive a data message;

b. transmitting a first data message to said destination node from said source node in response to said ready message;

c. transmitting a conditional disconnect message from said destination node to said source node upon receipt at said destination node of at least a predetermined amount (i.e. a "slice") of said first data message;

d. responding at said source node to receipt of said conditional disconnect message, by continuing transmission of said first data message to said destination node until said data message is completely transmitted or a new ready message is received from said destination node indicating readiness to receive a second data message, whichever occurs first; and e. further responding at said source node to said new ready message by ending transmission of said first data message and transmitting a slice of said second data message, said destination node transmitting a conditional disconnect message to said source node upon receipt of a slice of said second data message, whereby said source node responds by transmitting at least a further slice of said first data message, message slice transmissions continuing in a multiplexed manner until both data messages are completely transmitted.

9. A multi node data processing-system having an output data stream transfer rate that is less than inter-node data transfer rates, and further including a message protocol that enables allocation of the output data stream among competing messages, a node that is receiving a message called a destination node and a node that is transmitting a message called a source node, said system comprising:

a destination node including a processor, slice determining means for indicating when at least a predetermined portion of a data message has been received and buffer means for storing said predetermined portion of said received message, said processor causing said destination node to transmit a ready message to a source node when said destination node is prepared to receive a data message; and a source node including a processor, ready queue means for storing a list of data messages ready for transmission and memory means for storing a data message, said processor at said source node responsive to a received ready message from said destination node to transmit a data message listed in said ready queue to said destination node, said destination node responsive to an indication from said slice determining means to transmit to said source node a conditional disconnect message which causes said source node to either (a) disconnect from said destination node and to commence transmission of a slice of a further data message listed in said ready queue if a ready message has been received from a further destination node or (b) to continue transmission of said data message to said destination node until said data message has been completely transmitted or to follow the procedure of (a) if a ready message is later received from said destination node or another destination node, whichever occurs first.

10. The multi node data processing system as recited in claim 9 wherein said destination node further comprises:

message waiting means for providing an indication that another source node has attempted a message transmission to said destination node while said destination node is receiving a first slice of said data message, said processor in said destination node responsive to said indication to disconnect from said source node and to await a data message transmission from said another source node.

11. The multi node data processing system as recited in claim 9, wherein said slice determining means is software-controllable to vary the predetermined portion of a data message that must be received before an indication of a slice is manifest.

12. The multi node data processing system as recited in claim 10 wherein said source node responds to said disconnect message by transmitting to said destination node an end of transmission message which signals that an additional portion of said data message awaits transmission, followed by said source node listing said data message in a ready queue for subsequent transmission of said additional portions.

13. The multi node data processing system as recited in claim 12 wherein said destination node, upon receipt of at least a slice of said new data message from said another source node, transmits a ready message to said source node, thereby enabling said source node to commence transmission of at least a slice of said additional portion of said data message listed in said ready queue.

14. The multi node data processing system as recited in claim 9, wherein said destination node, upon disconnecting from said source node, transmits again to said source node a further ready message if a portion of said data message still awaits transmission, said source node, at the end of transmission of said slice of said further data message, responding to said further ready message by commencing transmission of at least a next slice of said data message to said destination node, said destination node and further destination node continuing to transmit further ready messages to said source node after respective disconnections from said source node until message completion signals are received by said destination node and further destination node, respectively.

* * * * *